US005412859A

United States Patent [19]

Hubbs et al.

[11] Patent Number: 5,412,859

[45] Date of Patent: May 9, 1995

[54] METHOD FOR JOINING A BOOKLET HAVING AN ELASTIC BAND AROUND A NECK OF A CONTAINER

[75] Inventors: Gerald G. Hubbs, Louisville, Ky.; George R. Burton, Lynchburg, Tenn.; Norman Bittner, Charlestown, Ind.

[73] Assignee: Brown-Forman Corporation, Louisville, Ky.

[21] Appl. No.: 65,267

[22] Filed: May 21, 1993

Related U.S. Application Data

[62] Division of Ser. No. 929,442, Aug. 14, 1992, Pat. No. 5,241,743.

[51] Int. Cl.[6] .......... B23P 21/00; B65B 13/02

[52] U.S. Cl. .......... 29/450; 29/DIG. 44; 53/137.1

[58] Field of Search .......... 29/243, 519, 235, 450, 29/451, 773, 775, 809, 822, DIG. 44; 40/211; 53/137.2, 290, 291, 292, 295, 556, 557, 585, 420, 137.1, 139.4; 206/389

[56] References Cited

U.S. PATENT DOCUMENTS

| | | | |
|---|---|---|---|
| 1,994,961 | 3/1935 | Proskauer | 40/311 |
| 2,091,891 | 8/1937 | Staves | 53/420 |
| 2,103,302 | 12/1937 | Strout | 53/292 X |
| 2,579,458 | 12/1951 | Allen et al. | 53/291 X |
| 2,852,899 | 9/1958 | Murrell | 29/775 |
| 3,186,333 | 6/1965 | Hoffman et al. | 53/235 X |
| 3,313,090 | 4/1967 | Kerrigan | 53/291 |
| 3,439,404 | 4/1969 | Pearson | 29/775 |
| 3,558,404 | 1/1971 | Metcalf | 53/291 X |
| 4,013,496 | 3/1977 | Amberg | 29/775 X |
| 4,215,460 | 8/1980 | Amberg et al. | 53/291 |
| 4,236,305 | 12/1980 | Hetherington et al. | 53/585 X |
| 4,392,337 | 7/1983 | Hara | 53/585 X |
| 4,514,966 | 5/1985 | Konstantin | 53/585 |

FOREIGN PATENT DOCUMENTS

| | | | |
|---|---|---|---|
| 2836299 | 3/1979 | Germany | 53/585 |
| 9009924 | 9/1990 | WIPO | 53/585 |

*Primary Examiner*—Peter Dungba Vo

*Attorney, Agent, or Firm*—Willian Brinks Hofer Gilson & Lione

[57] ABSTRACT

A neck booklet machine is described which places an elastic band having a booklet connected to the band around a neck of a container. The booklets are vertically stacked in a curved magazine and pulled by a vacuum cup from the curved magazine, which matches the natural curvature of a stack of booklets having an elastic band on one side. The bottom of the curved magazine is open to allow the elastic bands to hang free. The neck booklet is picked up by a carrier pad and held against and transported along a slide plate. A low vacuum nozzle pulls the loose elastic band downwardly to enable a loop of the elastic band to be picked up by a needle point and held precisely below the booklet on the slide plate. The elastic band is pulled down and around an opening horn extending from the needle point as the neck booklet moves along the slide plate by the carrier pad. The opening horn is carried on supports on the bottom and side with a top opening to allow the elastic band to pass over the opening horn. The opening horn feeds application fingers which index feeds the elastic band onto the neck of the container and releases the neck booklet at the end of the slide plate.

17 Claims, 5 Drawing Sheets

METHOD FOR JOINING A BOOKLET HAVING AN ELASTIC BAND AROUND A NECK OF A CONTAINER

This is a divisional of application Ser. No. 07/929,442, filed Aug. 14, 1992, now U.S. Pat. No. 5,241,743.

BACKGROUND OF THE INVENTION

The present invention is directed to a neck booklet machine which is adapted to place an elastic band, string or the like connected to a neck booklet around a neck of a container, such as a bottle, beverage container or the like.

Advertising devices, such as neck booklets having closed elastic bands, closed loops or the like connected thereto, are desirably placed around the neck of beverage containers to convey a particular advertising message for the particular beverage within the container. Proskauer, U.S. Pat. No. 1,994,961, entitled "ADVERTISING DEVICE" describes a container having a neck portion with a booklet. Means for securing the booklet include a cord, or the like, passing through the booklet and positioned around the neck portion of the container. (Col. 2, lines 9–13.)

The rapid placement of neck booklets around the neck of a container involves manually stretching of the elastic band and its manual placement around the neck of the container. Because of the nature of mass production of beverage containers, these manual tasks are labor intensive. For example, U.S. Pat. No. 2,091,891 to O. A. Staves entitled "ASSEMBLING OF BOTTLE SEALS AND STRANDS" describes a method and apparatus for applying one end of cord around a sealing cap enclosing the top of the neck of a bottle. The stopper secures the attached end of the cord to the top of the bottle neck leaving the free end of the cord hanging down to display a booklet. The stopper is inserted either automatically or by hand and the loop of the cord is applied around the body portion of the partially inserted stopper. However, Staves fails to describe a device to accomplish these tasks. As the bottle moves along the conveyor, the weight of the booklet dragging along a rail creates frictional resistance thereby causing a slight tensioning in the cord so as to remove slack from the cord. This prevents the cord from becoming dislodged from the body portion of the closure and allows the presser wheel to fully insert the closure. However, with the ever increasing speed of production lines having large numbers of moving beverage containers, the manual placement of neck booklets becomes more difficult and often requires additional people to perform the manual placement function.

Machines have also been designed to position elastic type members around the cylindrical objects, such as expandable neck labels around the neck of a container. For example, Amberg et al., U.S. Pat. No. 4,215,460, entitled "APPARATUS AND METHOD FOR ASSEMBLYING TUBULAR SLEEVE PREFORMS AND CONTAINERS" discloses a device to place a heat-shrinkable tubular sleeve about the neck of a container. The tubular sleeve is flat folded in a holder having dimensions complemental to the retained flattened stack of sleeves (Col. 3, line 55–57). As shown in FIG. 1 of Amberg et al., the flattened tubular sleeve is gripped by a pair of vacuum cups moving downwardly and divergently along chains to open the flattened sleeve. As shown in FIG. 2 the opened tubular sleeve is placed on a cylindrical mandrel to more fully open the tubular sleeve prior to its being mounted telescopically by a stripper element on the container neck portion of the container.

Hoffman et al., U.S. Pat. No. 3,186,333, entitled "RUBBER BAND STRETCHING APPARATUS", discloses a device for wrapping elastic bands around an article. The elastic bands are supplied in a stacked relationship, such as having adjacent bands connected to each other by a strip. A feeder blade grasps the lowermost band so that four expander fingers are positioned with the band. The outmost fingers are shifted downwardly and outwardly, the major component of their movement being horizontal. The innermost fingers are shifted downwardly and outwardly, with the major component of their movement being downwardly. (See FIGS. 2–7 of Hoffman et al.) As the elastic band is expanded, it engages four release fingers which are respectively disposed adjacent to the rear ends of the expander fingers. The curved and angulated configuration of the release fingers allows the elastic band to slip from engagement with them and engage the article.

Strout, U.S. Pat. No. 2,103,302, entitled "BAND APPLYING MACHINE" describes a machine for applying a tubular banding sleeve to a neck of a container. A magazine is disposed to store collapsed or flat sleeves. A first movable suction member withdraws a sleeve from the magazine and positions it over the neck of the container. Second suction members in cooperation and conjunction with the first suction member effects the opening of the sleeve. The sleeve is opened by an air jet via tubes which force air into the interior of the banding sleeve. An expansible member, first engages the sleeve as a cone shaped member and then expands itself and the sleeve into a cylindrical shape. This expands the sleeve into an open position for positioning onto the neck of the container.

Metcalf, U.S. Pat. No. 3,558,404, entitled "APPARATUS FOR APPLYING A LABEL TO A CONTAINER BY MOVING THE CONTAINER THROUGH RESILIENT FINGERS HAVING THE LABEL MOUNTED THEREON" describes a label applicator which applies a label to a container by first placing the label over a small end of a conical-shaped label stretcher comprising a plurality of resilient fingers affixed to a ring. (See FIGS. 1–4 of Metcalf.) As the container moves, via driving means, through the ring and the large end of the label stretcher towards the small end of the label stretcher, it expands the resilient fingers and the label. By applying pressure to the label perpendicular to the axis of the container, the label is secured to the container so that the container may be removed from the label applicator. Metcalf also suggests that a resilient expandable solid cone may be used in lieu of ring and expandable fingers.

It is evident that considerable work has been done in the field of mounting expandable bands around a neck of a container, or elastic bands around cylindrical objects, and the above described machines provide for important advantages in operation. Nevertheless, none of these devices use a curved magazine to maintain the stacked neck booklets having an elastic band therein in combination with first vacuum means to enable second vacuum means, a needle point, an opening horn and application fingers to affix the elastic band around the bottle neck as the bottles move sequentially along a conveyor. While these machines achieve their stated purpose, they are complex in operation and do not address the problem of affixing a neck booklet having an elastic band around the neck of a beverage container moving along a conveyor line.

None of the patents and patent applications described above provides the important advantages of providing a neck booklet machine capable of precisely affixing neck booklets having an elastic band therethrough onto beverage containers moving rapidly along a conveyor.

SUMMARY OF THE INVENTION

According to the invention, a machine for positioning a booklet having a band around a container comprises a magazine defined to receive a plurality of neck booklets. Vacuum means are positioned to sequentially remove in series the booklets from the magazine and position the booklets along a slide plate. Carrier pads are disposed to engage the neck booklet and incrementally transport the booklet along the slide plate. Positioning means, such as a vacuum nozzle, maintains the band in a downwardly projecting closed loop. A needle point is disposed to project into the open loop of the band as the band moves along the slide plate. An opening horn is affixed to the needle point, which is disposed to incrementally expand the band as the booklet moves along the slide plate. A plurality of application fingers are positioned to receive the expanded band, with the application fingers having at least three points to define an opening suitable for fitting the band around the container as the carrier pads incrementally transport the booklet along the slide plate and the band along the application fingers.

As pointed out above, the slide plate terminates in a manner so that the carrier pads release the booklet once the booklet is affixed around the neck of the container.

Preferably, a machine for positioning a neck booklet having an elastic band around a neck of a container includes a curved magazine defined to receive a plurality of neck booklets. A vacuum cup is positioned to sequentially remove in series neck booklets from the curved magazine and position the booklets along a slide plate. Carrier pads are disposed to engage the neck booklet and incrementally transport the neck booklet along the slide plate. The carrier pads in combination with a vacuum nozzle maintain the elastic band in a downwardly projecting open loop. A needle point is disposed to project into the open loop of the elastic band as the elastic band moves along the slide plate. An opening horn is affixed to the needle point and is disposed to gradually expand the elastic band as the neck booklet moves along the slide plate. Application fingers are positioned to receive the expanded elastic band with fingers having at least three points to define an opening suitable for fitting the elastic band around the neck of the container as the carrier pads incrementally transport the neck booklet along the carrier plate and elastic band along the application fingers.

Preferably, the neck booklet machine additionally comprises either a conveyor or rotatable table having a plurality of containers positioned on the conveyor or rotatable table. The application fingers are disposed in a manner to incrementally position the elastic bands around the containers.

The present invention additionally comprises a method for positioning a neck booklet having an elastic band around a neck of a container comprising steps of: providing a curved magazine to receive a plurality of neck booklets; providing a vacuum cup to sequentially remove in series neck booklets from the curved magazine and positioning the booklets along a slide plate; providing a plurality of carrier pads disposed to engage the neck booklet between the carrier pads and the slide plate; transporting incrementally the neck booklet along the slide plate via the carrier pads; providing a vacuum nozzle in combination with the carrier pads to maintain the elastic band in a downwardly projecting closed loop; providing a needle point projecting into the closed loop of the elastic band as the elastic band moves along the slide plate; providing an opening horn affixed to the needle point and disposed to gradually expand the elastic band as the neck booklet moves along the slide plate; and providing a plurality of application fingers to receive the expanded elastic band with the fingers having at least three points to define an opening suitable for fitting the elastic band around the neck of the container as the carrier pads incrementally transport the neck booklet.

Furthermore, the above method additionally includes the steps of terminating the slide plate in a manner so that the carrier pads release the booklet once the booklet is affixed around the neck of the container.

As pointed out in greater detail below the neck booklet machine of this invention provides important advantages. It can precisely and accurately place a neck booklet on the neck of a beverage container while the beverage container is moving along a conveyor belt. Additionally, it can handle a wide variety of shapes and sizes of necks of beverage containers moving at a range of production line speeds. Further, the neck booklet machine of the present invention provides a rugged construction which is easy to repair and maintain, e.g., a neck booklet jamming along the slide rail.

The invention itself, together with further objects and attendant advantages, will best be understood by reference to the following detailed description taken in conjunction with the accompanying drawings.

DETAILED DESCRIPTION OF THE INVENTION

Figures 1, 6:
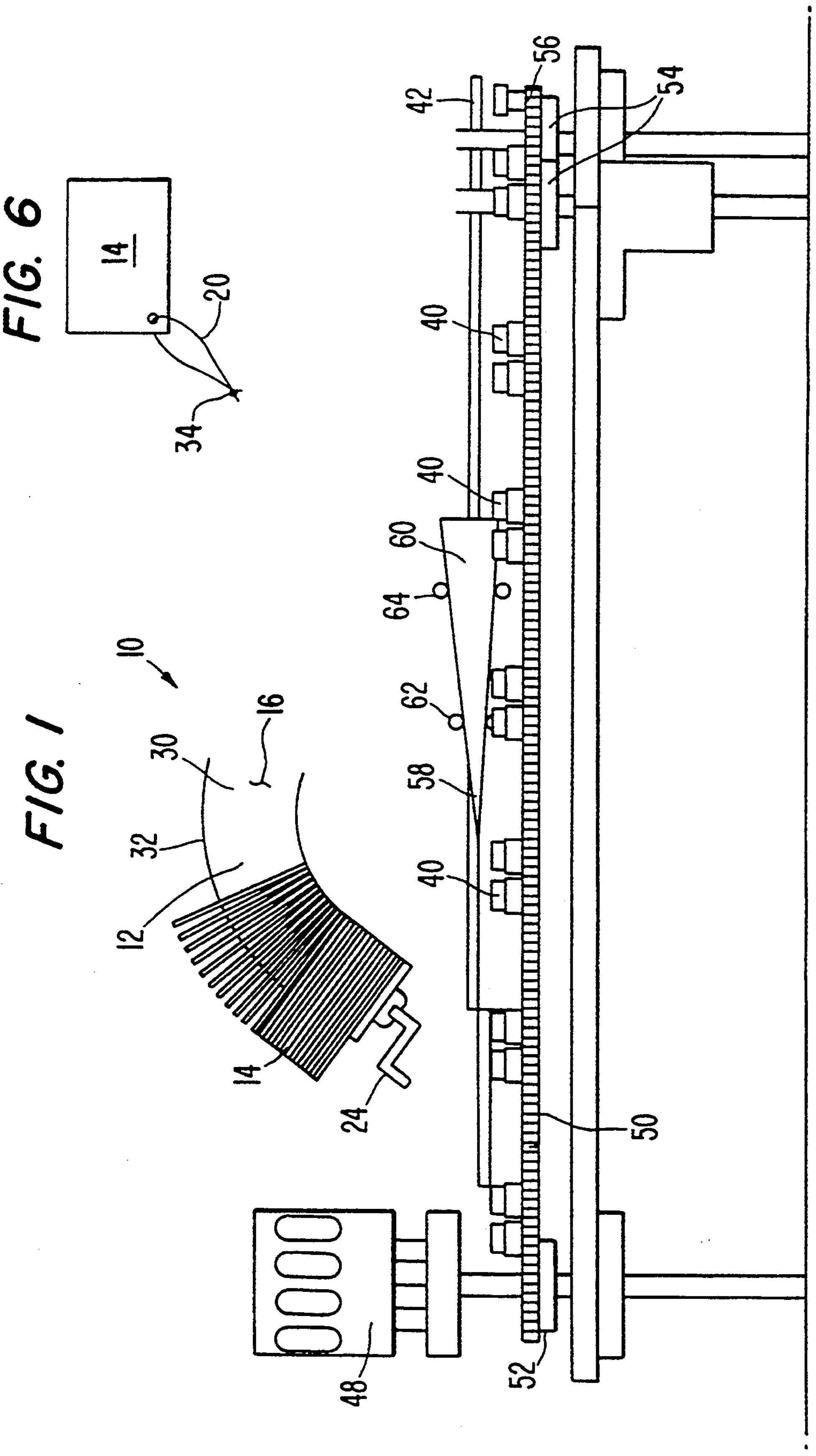
FIG. 1 shows a top view of the neck booklet machine of the present invention.
FIG. 6 shows a neck booklet with a punched hole having an elastic band positioned therethrough and tied into a knot.

Turning now to FIG. 1 of the drawings, the neck booklet machine 10 includes a curved magazine 12 holding a plurality of booklets or neck booklets 14. The neck booklets 14 are generally vertically positioned within a slide plate 16 positioned at the bottom of the curved magazine 12. The neck booklets 14 have elastic bands 20 tied through a punched hole 22 in the neck booklet 20. See FIG. 6. Preferably, the elastic band 20 includes a fabric or cloth coating positioned over an elastic material. Typically, the elastic material is about 1 mm in diameter with the fabric coating about 0.5 mm to provide an elastic band of about 1.5 mm in diameter. By use of the term elastic, it is intended to include any expandable-resilient material which may be suitably expanded to be positioned over a neck of a container and resiliently contract therearound once expansion forces are released, or contracted due to the application of physical conditions or phenomenon such as heat, pressure, UV radiation, etc.

As shown in FIG. 1, the neck booklets 14 are vertically stacked in the curved magazine 12 and sequentially pulled in series from the magazine by a vacuum cup 24, or other removal means such as frictional pads. The shape of the curved magazine 12 matches the natural curvature of a stack of neck booklets 14 having an elastic band 20 positioned on one end 26 to render one end of the booklet thicker than the other end 28 of the booklet. The bottom 30 of the curved magazine 12 includes an arc-shaped opening 32 to allow the elastic bands 20 to hang free in an essentially vertical position. The elastic bands 20 have a knot 34 positioned therein which provides a length of about 1½ inches and forms a closed loop 36*a* of about 3 inches in diameter. When the neck booklets 14 are vertically stacked in the curved magazine 12, the closed loop 36*a* of the elastic band is positioned to hang downwardly through the opening 32 in the curved magazine 12 to position the closed loop 36*a* so that the knot 34 is disposed at the bottom of the closed loop 36*a* of the elastic band 20. A knot tying machine for elastic bands suitable for use in this invention is a model #185 Whirlwind knot tying machine available from the Bobst Corporation in New Jersey.

Figure 2:
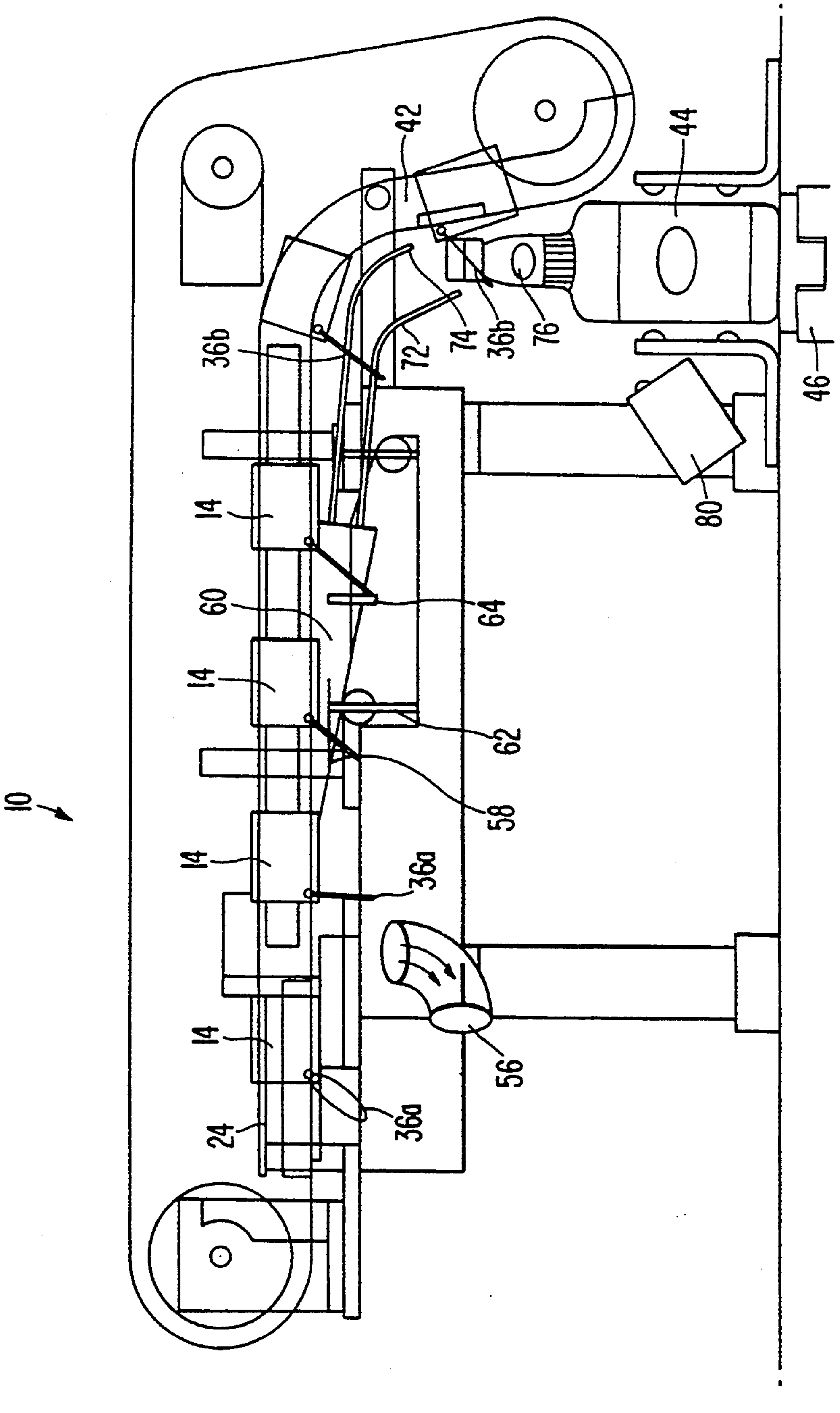
FIG. 2 shows a side view of the neck booklet machine of the present invention.

As additionally shown in FIG. 2, the booklet 14 is picked up by a carrier pad, such as a carrier pressure pad 40, and held against and transported along a slide plate 42 toward a container transport means, such as a conveyor 46, having containers 44 positioned thereon. An indexing drive motor 48 moves an endless flexible member, such as chain 50, upon which the carrier pads 40 are positioned. The chain 50 is positioned between drive rotational member 52 and idler rotation member 54, which moves the neck booklets 14 via the carrier pads 40 therebetween.

As the neck booklet 14 moves along the slide plate 42, a low vacuum nozzle 56 pulls and holds the closed loop 36*a* of the elastic band 20 down to a generally vertical position. This vacuum pull by the vacuum nozzle 56, in combination with the carrier pads 40 enables the closed loop 36*a* of the elastic band 14 to be picked up by a needle point 58. In this manner, the loose elastic band 20 is held precisely below the neck booklet 14 on the slide plate 42. By continued movement of the carrier pressure pads 40 carrying the neck booklet 14 and elastic band 20 along the slide plate 42, the elastic band 20 is pulled down and around an opening horn 60 extending from the needle point 58.

Figure 3B:
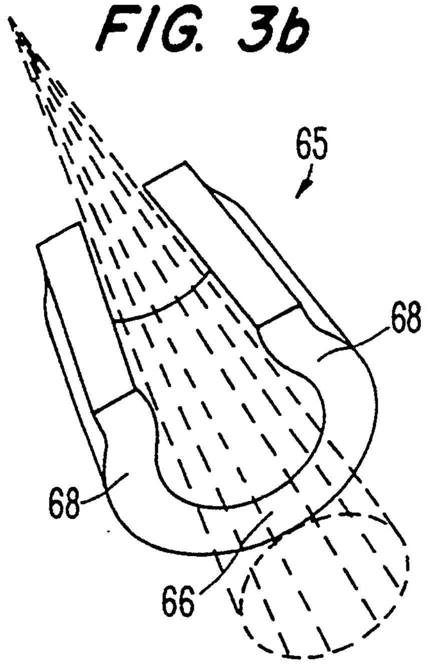
FIG. 3*b* shows an extended "U" shaped member suitable to support the opening horn.
Figure 3A:
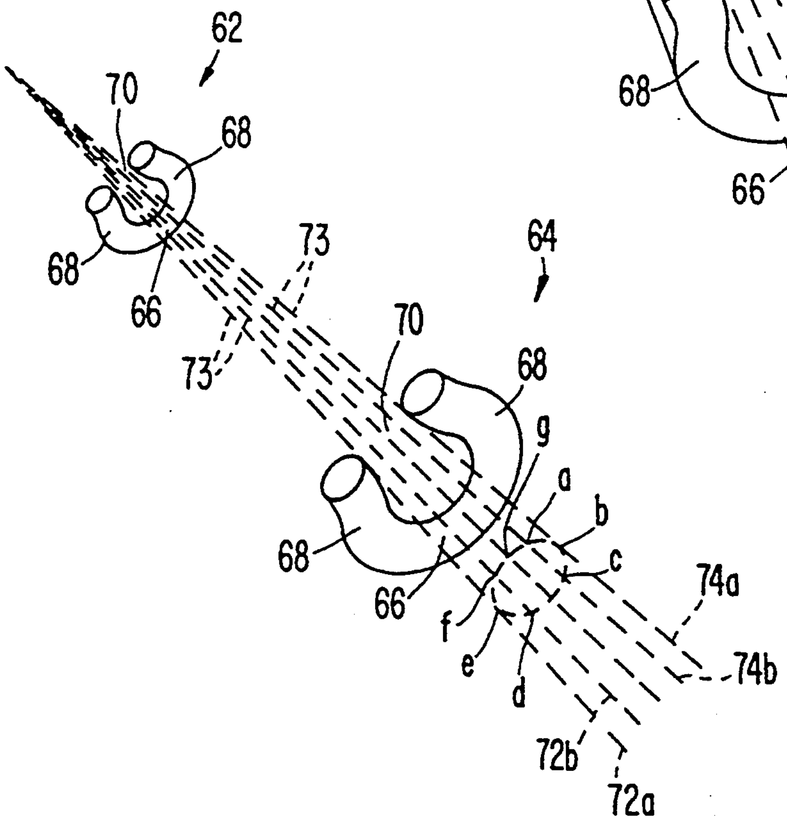
FIG. 3*a* shows forward and rearward "U" shaped members which support an opening horn.

As shown in FIG. 3*a*, the opening horn 60 is carried on front support 62 and rear support 64 on the bottom 66 and sides 68 with a top opening 70 positioned to allow the elastic band 20 to pass over and around the opening horn 60, as shown in phantom lines and becomes an open loop 36*b*. In more detail, the opening horn 60 is loosely supported by the two "U" shaped supports 62, 64 (or horse collars) to allow the thickness of the elastic band 20 to pass between the support members 62, 64 and the opening horn 60.

As illustrated in FIG. 2, the opening horn 60 is a generally conical shape having one plane generally parallel, or adjacent, to the axis or path of the slide bar 42. As the elastic band 20 is pulled along the slide plate 42 by the neck booklet 14 being moved by the carrier pressure pads 40, the elastic band 20 moves along the opening horn 60 to be stretched into an expanded position and form an open loop 36*b*. As shown in FIG. 2, as the carrier pressure pads 40 move the booklet 42 along the slide plate 42, the opening horn 60 feeds the elastic band 14 into a plurality of application fingers 72, 74.

Figure 4:
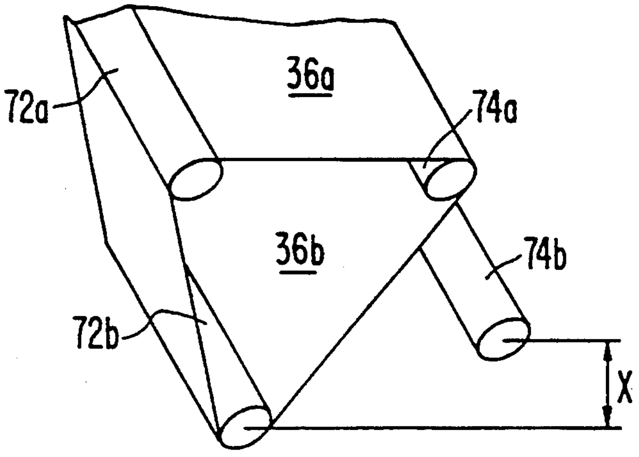
FIG. 4 shows one end of one of a plurality of the application fingers being a distance "d" shorter than the other application fingers thereby forming three points to expand an elastic band loop.

Preferably, as shown in FIG. 4, the four application fingers 72*a*, 72*b*, 74*a*, 74*b* maintain the elastic band 20 in an expanded position, and when indexed to the next container 44 positioned along the conveyor 46, feed the expanded elastic band 14 onto the neck 76 of the container 44. The carrier pressure pads 40 release the neck booklet 14 at the end of the slide plate 42 at the precise time as the elastic band 20 is positioned over the neck 76 of the container 44 by the plurality of fingers 72*a*, 72*b*, 74*a*, 74*b*. Typically, the elastic band 20 is expanded from about 3 inches in circumference to about 4 inches in circumference. One of the application fingers 74*b* is a lesser length by distance "X" than the other three application fingers 72*a*, 72*b*, 74*a* to define the three points on the elastic band 20*b*. In this manner, the opening in the elastic band 20 defined by points by 72*a*, 72*b*, 74*a* is suitable for fitting the elastic band 14*b* around the neck 76 of the container 44. Typically, the neck 76 of the container 44 is about 28 mm and the above expansion is suitable to position the elastic band 20 therearound. The number of application fingers may be reduced or increased depending upon the resiliency of the elastic band to be affixed around the neck 76 of the container 44.

The incremental positioning of the neck booklets 14 with the elastic band 20 onto the neck 76 of containers 44 being transported on a conveyor or rotatable table is accomplished by use an indexing photo cell 80 coupled to the indexing drive motor 48. In this manner, the indexing photo cell 80 precisely coordinates the movement of the carrier pressure pads 40 along the slide plate 42 as the containers 44 move under the plurality of application fingers 72, 74. Each continuous or sequential movement of the container 44 along the conveyor 46 brings about an incremental movement of the carrier pressure pads 40 along the slide plate 42 and the resulting positioning of the expanded elastic band 14 over the neck 76 of the container 44. In this manner, the neck booklet machine 10 can handle a wide range of production line speeds with precision and accuracy.

Variations on the embodiments described above are possible. For example, as shown in FIGS. 1, 2, 3*a*, 3*b* and 4, the present invention additionally comprises a method for positioning a neck booklet 14 having an elastic band 20 around a neck 76 of a container 44 comprising the steps of: providing a curved magazine 12 to receive a plurality of neck booklets 14; providing a vacuum cup 24 to sequentially remove in series neck booklets 14 from the curved magazine 14 and positioning the neck booklets 14 along a slide plate 42; providing a plurality of carrier pads 40 disposed to engage the neck booklet 14 between the carrier pads 40 and the slide plate 42, transporting incrementally the neck booklet 14 along the slide plate 42 via the carrier pads 40; providing a vacuum nozzle 56 in combination with the carrier pads 40 to maintain the elastic band 20 in a downwardly projecting closed loop 36*a*; providing a needle point 58 projecting into the closed loop 36*a* of the elastic band 20 as the elastic band 20 moves along the slide plate 42; providing an opening horn 60 affixed to the needle point 58 and disposed to gradually expand the elastic band 20 in an open loop 36*b* as the neck booklet 14 moves along the slide plate 42; and providing a plurality of application fingers 72, 74 to receive the expanded elastic band 20, with the application fingers 72, 74 having at least three points to define an opening suitable for fitting the elastic band 44 around the neck 76 of the container 44 as the carrier pads 40 incrementally transport the neck booklet 14. Furthermore, the above method additionally includes the steps of terminating the slide plate 42 in a manner so that the carrier pads 40 release the neck booklet 14 once the neck booklet 14 is affixed around the neck 76 of the container 44.

In another variation, the neck booklet machine 10 of the present invention may be used to position an elastic band 20 around any cylindrical object or materials, such as containers, rolled papers, etc. Rather than use a printed booklet, a simple destructible card can be used as a carrier along the slide plate 42 of the neck booklet machine 10 to properly position the elastic band 14. Once the elastic band 14 is positioned around the cylindrical object, the destructible card may be removed manually, or by a machine such as a rotating brush which bears against the destructible card.

In yet a further variation, a plurality of the neck booklet machines 10 of the present invention may be ganged together in series to serve a plurality of moving conveyors 46 or rotatable tables having containers 44 positioned thereon.

In yet another variation, as shown in FIG. 3*b*, the opening horn 60 includes at least one "U" shaped support 65, the "U" shaped support 65 loosely supports the opening horn to allow the elastic band 20 to pass between the support and the opening horn 60, shown in phantom. Alternately, the opening horn 60 may be supported by either air bearings or magnetic means in a manner to allow the elastic band to pass therebetween.

In another variation, as shown in FIG. 2, one or two of the application fingers 72 or 74 may be affixed to the opening horn 60 to support the opening horn 60 in a manner to allow the elastic band 20 to pass between the supports 62, 64 and the opening horn 60 onto the application fingers 72, 74. This support of the opening horn 60 by the application fingers 72 or 74 is preferably in combination with the supports 62, 64 which are positioned on sides and bottom of the opening horn 60, but may be accomplished separately provided the application fingers 72, 74 are supported in a like manner as is the opening horn 60.

Merely by way of example of another variation, the carrier pads 40 may comprise either pressure pads, friction pads or vacuum cups or other suitable means to transport the neck booklets 14.

In yet another variation, the opening horn 60 may define either a circular, square, triangular, oval or other suitable cross-section conformed to match the shape of the container 44 on which the neck booklet 14 is to be affixed. Preferably, the cross-section of the opening horn 60 is matched to the cross section of the application fingers 72, 74 to assure ease of movement of the elastic band 20. More preferably, the opening horn 60 defines a cylindrically shaped solid cone having an angle less than 30°.

In another variation, as schematically illustrated in FIG. 3*a*, the opening horn 60 may be defined by a plurality of opening horn fingers, illustrated by phantom lines 73*a–g*, with selected opening horn fingers 73*a–g* being coextensive with the application fingers 72*a*, 72*b*, 74*a*, 74*b*.

In a further variation, the number of application fingers 72, 74 may be reduced or increased depending upon the resiliency of the elastic band 20 to be affixed around the neck 76 of the container 44, provided that the application fingers 72, 74 define at least three points 72*a*, 72*b*, 74*a* to receive the elastic band just prior to its placement on the neck 76 of the container 44. For example, as shown in FIG. 4 when the four application fingers 72*a*, 72*b*, 74*a*, 74*b* are defined to convey the elastic band 36*a* from the opening horn, one of the application fingers 74*b* is a lesser length than the other three application fingers 72*a*, 72*b*, 74*a* to define the three points on the elastic band 14*b*. In this manner, the open loop 36*b* in the elastic band 20 is suitable for fitting the elastic band 20*b* around the neck 76 of the container 44.

Figure 5A:
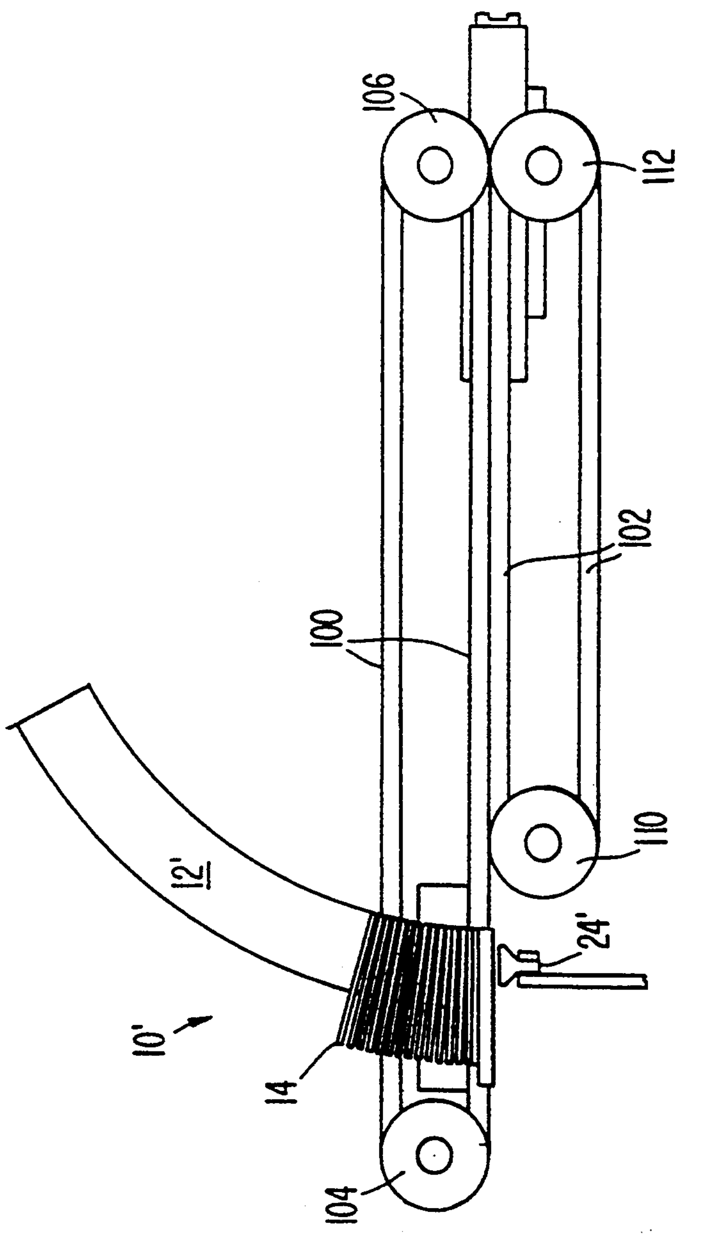
FIGS. 5*a* and 5*b* show a top and side view respectively of an alternate embodiment a neck booklet machine according to the present invention.
Figure 5B:
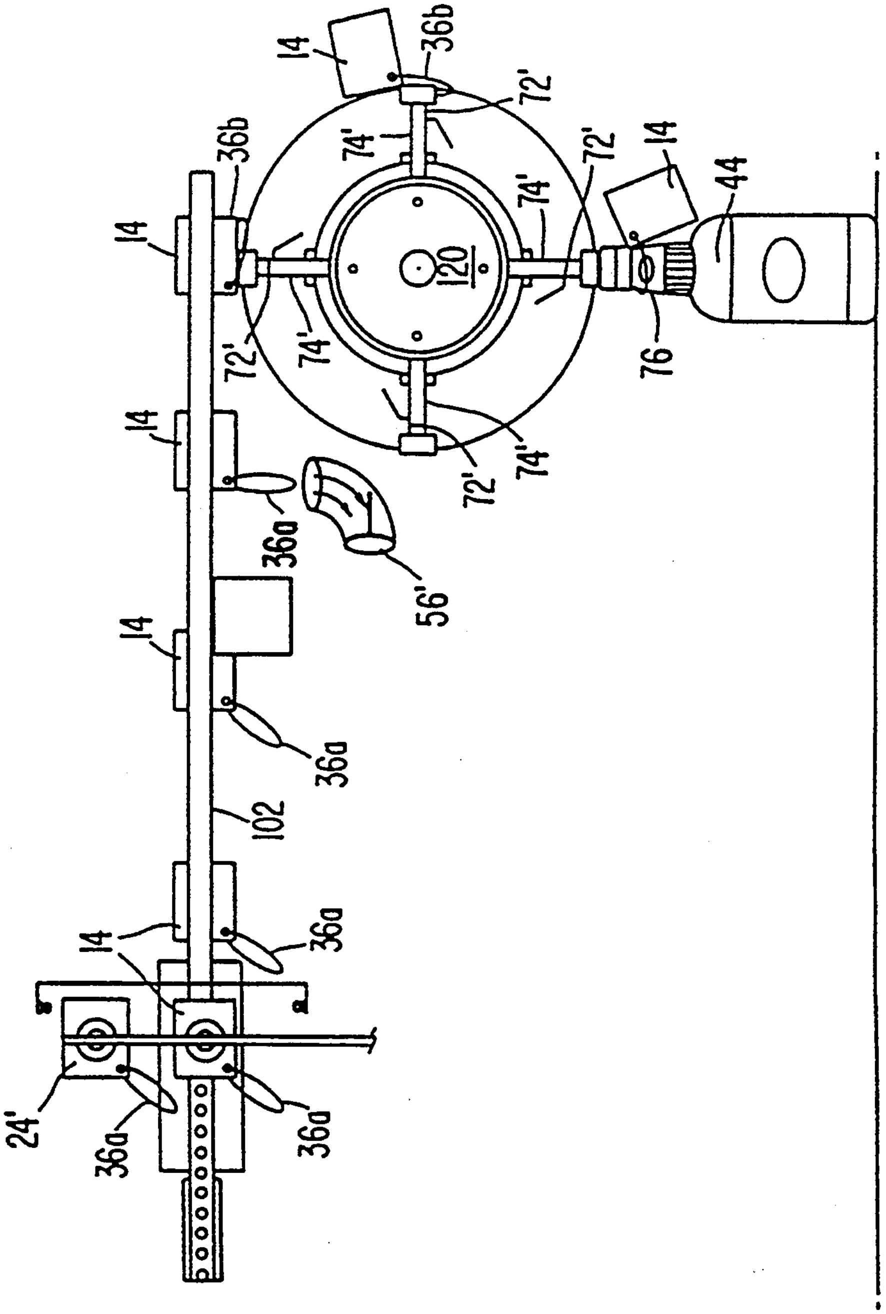

In yet another variation, as shown in FIGS. 5*a* and 5*b*, the neck booklet machine 10′ includes the curved magazine 12′ and vacuum cup 24′ as described above. Vacuum cup 24′ positions neck booklets 14 between parallel endless members 100, 102, which are spaced apart and moved incrementally around pulleys 104, 106 and 110, 112, respectively. The endless parallel members 100, 102 function as the carrier pads 40 and slide plate 42 of the embodiment described in FIGS. 1 and 2. As the neck booklets 14 progress along the endless members 102, 104, the closed loop 36*a* of the elastic band 20 is pulled down in a vertical position by vacuum nozzle 56′. The closed loop 36*a* is grasped by two application fingers 72′, 74′ positioned on a rotating wheel 120 and expanded by relative motion of the application fingers 72′, 74′ to the endless members 100, 102 into an open loop 36*b* by the rotational forces of the rotating wheel 120 on the application fingers 72′, 74′. The plurality of application fingers 72′, 74′ are spaced about the rotating wheel 120, which is timed to incrementally place the open loop 36*a* around the necks 76 of containers 44 positioned on conveyor 46. In this manner, the rotating wheel performs the function of the needle point 58 and opening horn 60 of the embodiment described in FIGS. 1 and 2. At least one of the application fingers is of a bladelike or arcuate structure so that the application fingers 72′, 74′ define a minimum of three points to properly place the elastic band 20 around the neck of the container 44.

The embodiments described above provide a number of significant advantages. As described above, the neck booklet machine 10 features the combination of the curved magazine 12 with the carrier pads 40 and slide plate 42 which enable the needle point 58, opening horn 60 and application fingers 72, 74 to affix the elastic band 20 around the neck 76 of the container 44 as the container 44 moves sequentially along a conveyor 46. In this manner, the neck booklets 14 via the elastic bands 20 are precisely and accurately positioned around the necks 76 of containers 44 moving along conveyors 46 at high speeds.

Of course, it should be understood that a wide range of changes and modifications can be made to the preferred embodiment described above. It is therefore intended that the foregoing detailed description be understood that it is the following claims, including all equivalents, which are intended to define the scope of this invention.

We claim:

1. A method for positioning a neck booklet having an elastic band around a neck of a container comprising:

placing a plurality of neck booklets on a curved magazine;

sequentially removing in series said neck booklets from said curved magazine by a vacuum cup and positioning said neck booklets along a slide plate;

providing a plurality of carrier pads disposed to engage said neck booklets between said carrier pads and said slide plate;

transporting incrementally said neck booklets along said slide plate via said carrier pads;

maintaining with a vacuum nozzle said elastic band in a downwardly projecting closed loop;

projecting a needle point into said closed loop of said elastic band as said elastic band moves along said slide plate;

affixing an opening horn to said needle point and disposing said horn, thereby gradually expanding said elastic band into an open loop as said neck booklet moves along said slide plate;

receiving said expanded elastic band with a plurality of application fingers, said application fingers having at least three points to define an opening suitable for fitting said elastic band around said neck of said container as said carrier pads incrementally transport said neck booklet; and placing said expanded elastic band around said neck of said container.

2. The invention of claim 1, additionally comprising deactivating the operation of said slide plate in a manner so that said carrier pads release said neck booklet once said elastic band is affixed around said neck of said container.

3. The invention of claim 1, additionally comprising detecting said containers moving along a conveyor pad or rotatable table with an indexing photo cell, incrementally moving said carrier pads along said slide plate with an index drive motor, said indexing photo cell connected to said indexing drive motor to control said incremental movement of said carrier pads.

4. The invention of claim 1, wherein said opening horn includes at least one "U" shaped support member, said "U" shaped support member loosely supporting said opening horn to allow said elastic band to pass between said support member and said opening horn.

5. The invention of claim 1, wherein said opening horn defines either a circular, square, triangular or oval cross-section.

6. The invention of claim 1, wherein said opening horn defines a cylindrically shaped cone having an angle less than 30°.

7. The invention of claim 1 additionally comprising transporting with a transport means a plurality of said containers into vicinity of said application fingers; said application fingers incrementally positioning said elastic bands around said containers, said carrier pads and slide plate releasing said neck booklets after positioning said elastic bands around said container.

8. The invention of claim 1 additionally comprising transporting with either a conveyor or a rotatable table a plurality of said containers into vicinity of said application fingers; said application fingers incrementally positioning said elastic bands around said containers, said carrier pads and slide plate releasing said neck booklets after positioning said elastic bands around said container.

9. The invention of claim 1, wherein said curved magazine receives said neck booklets in a generally vertical position in said magazine, said elastic bands having a knot positioned to hang downwardly through an opening in said magazine to form a closed loop with said knot near the bottom of the closed loop of said elastic band.

10. The invention of claim 1, wherein said carrier pads comprise pressure pads, friction pads or vacuum cups.

11. The invention of claim 10, wherein said carrier pads comprise pressure pads.

12. The invention of claim 1, wherein said elastic band includes a fabric or cloth coating.

13. The invention of claim 1, wherein said opening horn is supported by either air bearings or magnetic means in a manner to allow said elastic band to pass freely along said opening horn.

14. The invention of claim 1, wherein at least two of said application fingers are affixed to said opening horn to support said opening horn in a manner to allow said elastic band to pass between said support member and said opening horn onto said application fingers.

15. The invention of claim 14, wherein said opening horn comprises a plurality of opening horn fingers, said opening horn fingers being coextensive with said application fingers.

16. The invention of claim 1, wherein four application fingers are defined to convey said elastic band from said opening horn.

17. The invention of claim 1, wherein four application fingers are defined to convey said elastic band from said opening horn, one of said four application fingers being of a lesser length than the other three application fingers to define said opening suitable for fitting said elastic band around said neck of said container.

* * * * *

UNITED STATES PATENT AND TRADEMARK OFFICE
CERTIFICATE OF CORRECTION

PATENT NO. : 5,412,859

DATED : May 9, 1995

INVENTOR(S) : Gerald G. Hubbs et al.

It is certified that error appears in the above-identified patent and that said Letters Patent is hereby corrected as shown below:

Column 5, line 1, Change "20" to "14"

Column 5, line 53, Change "14" to "20"

Column 6, line 18, Change "14" to "20"

Column 6, line 29, Delete 2nd occurrence of "by"

Column 6, line 30, Change "14b" to "20"

Column 6, line 62, Change "14" to "12"

Column 8, line 16, After "band" insert "20 or loop"

Column 8, line 21, Change "20b" to "20"

Signed and Sealed this

Fifteenth Day of April, 1997

*Attest:*

BRUCE LEHMAN

*Attesting Officer* *Commissioner of Patents and Trademarks*